United States Patent [19]

Smith, Jr. et al.

[11] Patent Number: 4,645,943
[45] Date of Patent: Feb. 24, 1987

[54] SPACE-SAVING BACK-UP POWER SUPPLY

[75] Inventors: John W. Smith, Jr., Dallas; Francis A. Scherpenberg, Carrollton; Ching-Lin Jiang; Michael L. Bolan, both of Dallas, all of Tex.

[73] Assignee: Dallas Semiconductor Corporation, Dallas, Tex.

[21] Appl. No.: 660,937

[22] Filed: Oct. 15, 1984

[51] Int. Cl.⁴ ............................................. H02J 9/02
[52] U.S. Cl. ..................................... 307/150; 307/66; 307/64; 361/401; 361/405; 429/124; 429/123
[58] Field of Search ............... 307/150, 200, 64, 66; 361/400, 401, 405, 414, 417, 418; 340/52 F, 662, 663; 429/124, 123, 191; 357/40, 92; 29/592 R

[56] References Cited

U.S. PATENT DOCUMENTS

| | | | |
|---|---|---|---|
| 3,859,638 | 1/1975 | Hume, Jr. | 340/173 R |
| 4,122,359 | 10/1978 | Breikss | 307/66 |
| 4,209,710 | 6/1980 | Quarton | 307/66 |
| 4,315,162 | 2/1982 | Ferguson | 340/663 X |
| 4,342,069 | 7/1982 | Link | 361/401 |
| 4,381,458 | 4/1983 | Anstey et al. | 307/150 X |
| 4,478,472 | 10/1984 | Baar | 339/147 R X |
| 4,502,101 | 2/1985 | Jodoin | 361/321 C X |
| 4,523,295 | 6/1985 | Zato | 340/662 X |
| 4,539,621 | 9/1985 | Currier | 361/405 X |
| 4,540,226 | 9/1985 | Thompson et al. | 361/401 X |

FOREIGN PATENT DOCUMENTS 8100706 5/1981 European Pat. Off. .
3048451 7/1982 Fed. Rep. of Germany ...... 361/405

OTHER PUBLICATIONS

United Technologies Mostek Advertisement in Electronic Design, Jul. 12, 1984, p. 183.

Primary Examiner—William M. Shoop, Jr.
Assistant Examiner—Shik Luen Paul Ip
Attorney, Agent, or Firm—David N. Leonard

[57] ABSTRACT

A space-saving back-up power supply apparatus has length and width dimensions substantially the same as those of a conventional integrated circuit connector. The apparatus includes sockets arranged on its top for making connection to a socket-pluggable integrated circuit such as a standard CMOS RAM, and the apparatus has pins extending from its bottom for making connection to a printed circuit board or connector of a host electronic system. Control circuitry and one or more batteries are located within the apparatus. The back-up power supply is operative to provide power to the socket-pluggable integrated circuit even if the normal power supply of the host electronic system is short-circuited. The control circuitry of the back-up power supply controls the chip enable signal and performs a battery test upon power-up.

9 Claims, 7 Drawing Figures

SPACE-SAVING BACK-UP POWER SUPPLY

The present invention generally relates to electronic systems and, more particularly, is concerned with space-saving apparatus and method for providing a back-up power supply to a socket-pluggable integrated circuit.

BACKGROUND OF THE INVENTION

A battery back-up power supply is a desirable feature to incorporate into many electronic systems or subsystems. It especially is desirable in connection with memory to prevent the loss of data stored in the memory upon failure (or disconnection) of the primary power supply of the system. In this regard, recent advances in cost-effectiveness and availability of CMOS RAM integrated circuits which require low-standby power are responsible, at least in part, for increased industry interest in adding non-volatility to read/write random access memory in electronic systems.

In the past, various electrical circuits have been devised for automatically connecting a back-up power supply to memory when the normal power supply fails. Similarly, various back-up power supply circuits have been proposed wherein it is an objective to provide the capability to remove a memory module from its host electronic system and transport the module elsewhere without loss of data.

Efficient space utilization and low cost are generally desirable objectives for the packaging of a back-up power supply. For efficient space utilization, it has been proposed that a back-up power supply be packaged in a module having pins extending from the bottom of the module for engaging the sockets of a dual-in-line printed circuit board connector and the module having dual-in-line socket contacts on the top of the module for engaging the pins of a dual-in-line packaged integrated circuit memory. Such a vertically-stacked arrangement is advantageous inasmuch as printed circuit board area required for a dual-in-line circuit board connector is not increased by the addition of such a module. In this particular arrangement, each socket on the top of the back-up power supply module is electrically connected to a corresponding pin on the bottom of the module. Accordingly, the back-up power supply circuitry is connected electrically in parallel with the normal power supply of the system. Such an arrangement may be suitable in applications where the objective is the capability of removing the memory from the host system without loss of data. In that type of application, the back-up power supply module and the integrated circuit memory are removed as a unit from a connector mounted to a printed board of the host system. This arrangement, however, is not suitable for providing power to the associated integrated circuit memory if the normal power supply of the system were to fail by becoming short-circuited. Moreover, this arrangement and many other of the prior art generally provide relatively limited functional features by comparison to the present invention; such prior art circuitry typically only provides means for providing back-up power plus means for inhibiting either the chip enable or write enable input to an integrated circuit memory during power failure or disconnection.

There are other proposals for providing back-up power to an integrated circuit without increase in printed circuit board area beyond that of a conventional connector. One such proposal is depicted in *Electronic Design,* July 12, 1984, page 183. The commercial version of this approach includes two lithium batteries secured in recesses within a structure which is connected in a piggy-back fashion onto the top of an integrated circuit package containing a non-standard CMOS RAM chip. The integrated circuit package which contains the CMOS RAM chip includes a customized lead frame for interconnection of the batteries to the chip. The CMOS RAM chip may be regarded as non-standard inasmuch as battery back-up circuitry is included in the circuitry therein. Consequently, although this version conforms to a popular standard pin assignment and thus can be interchanged with standard CMOS RAMS available from other manufacturers, replacement of this commercial version with a pin-compatible standard CMOS RAM would result in loss of the non-volatility function.

In accordance with the foregoing, a need exists for a space-saving back-up power supply usable in conjunction with interchangeable standard socket-pluggable integrated circuits and having improved functional features.

SUMMARY OF THE INVENTION

The present invention provides a back-up power supply to a socket-pluggable integrated circuit while requiring no more printed circuit board area than a conventional printed circuit board connector. Furthermore, the present invention is designed to provide the back-up power to the integrated circuit even if the primary power supply of the host system becomes short-circuited.

Another feature of the invention is that standard widely-available socket-pluggable integrated circuit memories from different manufacturers can be interchanged without sacrificing the non-volatility function. This is of particular advantage for $2K \times 8$ CMOS static RAMS.

Yet another feature of the invention is that different density standard socket-pluggable RAMS can be utilized with the apparatus of the invention, thereby adding further interchangeability to the system. More specifically, apparatus fabricated to be used in conjunction with standard $2K \times 8$ RAMS in accordance with the present invention can be used without modification with standard $8K \times 8$ CMOS static RAMS.

In its most general form, the present invention comprises apparatus for providing a back-up power supply to a socket-pluggable integrated circuit in an electronic system. The apparatus includes an integrated circuit connector within which is packaged an energy source and a controller circuit. The energy source and controller circuit are automatically operative to provide back-up power to the socket-pluggable integrated circuit upon failure of the normal or primary power supply of the electronic system, even if failure of the normal power supply is caused by the normal power supply becoming short-circuited.

In a more detailed embodiment of the present invention, apparatus having length and width dimensions substantially the same as those of a conventional integrated circuit connector and being arranged for use in a vertically-stacked separable relationship with a socket-pluggable integrated circuit includes: a structure having sockets arranged on the top of the structure for removably making connection to the socket-pluggable integrated circuit; pins extending from the bottom of the structure for making electrical connection to a host electronic system having a normal power supply; one or more batteries located within the structure; and, electronic circuitry located within the structure and connected to the sockets and pins of the structure for providing a back-up supply for the socket-pluggable integrated circuit which is plugged into the sockets on the top of the structure.

The present invention also comprises a method of constructing an apparatus for providing a back-up power supply to a socket-pluggable integrated circuit in an electronic system. The method includes the following steps: mounting a controller circuit, an integrated circuit connector, and lead frame pins onto an interconnecting substrate such as a printed circuit board; mounting one or more batteries onto the interconnecting substrate; and, encapsulating the batteries and portions of the lead frame pins.

As is apparent from the foregoing summary, it is a general object of the present invention to provide a novel and improved back-up power supply to a socket-pluggable integrated circuit in an electronic system.

Other objects and advantages, and a more complete understanding of the invention may be obtained by referring to the following detailed description of a preferred embodiment when taken in conjunction with the accompanying drawings.

DETAILED DESCRIPTION OF A PREFERRED EMBODIMENT

Figure 1:
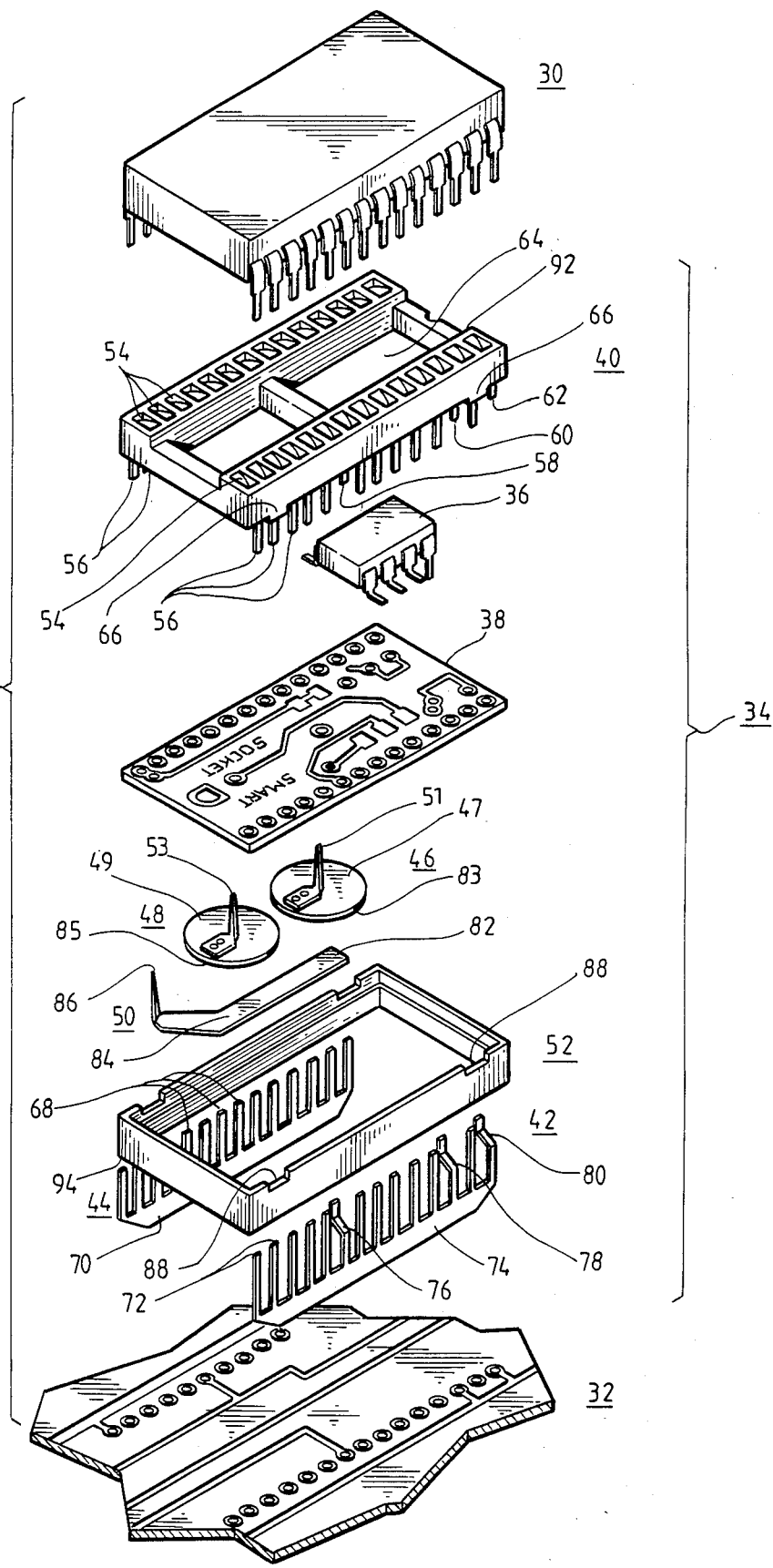
FIG. 1 is an exploded perspective view of a socket-pluggable integrated circuit, apparatus for providing a back-up power supply to the integrated circuit, and a portion of a printed circuit board of a host electronic system.

Referring now to the drawings, and more particularly to FIG. 1, there is shown a conventional socket-pluggable integrated circuit 30 housed in a conventional dual-in-line package. For use in conjunction with the exemplary and preferred embodiment of the present invention, the integrated circuit 30 is either a 24-pin 2K×8 or a 28-pin 8K×8 standard volatile CMOS RAM. Suitable 24-pin 2K×8 CMOS RAMS include the Toshiba TC5517 and the NEC uPD446; suitable 28-pin 8K×8 CMOS RAMS include the Toshiba TC5564. Also shown is a portion of a printed circuit board 32 which is representative of a host electronic system having a normal or primary power supply (not shown in FIG. 1). The integrated circuit 30 cooperates with, and therefore must be electrically connected to, the host electronic system. For this purpose, in the prior art the integrated circuit 30 is typically either soldered to a printed circuit board of the host electronic system or, if it is desired that the integrated circuit 30 be readily interchangeable with other integrated circuits of like or different kind, a conventional printed circuit board connector having sockets along its top and pins extending from its bottom is first soldered to the printed circuit board 32, and the integrated circuit 30 is removably plugged into the connector. In such an arrangement, if it is desirable to provide a back-up power supply to power the integrated circuit 30 upon failure of the normal or primary power supply, circuitry comprising the back-up power supply is typically mounted on the printed circuit board 32 or elsewhere in the host electronic system. In a preferred embodiment of the present invention, however, the energy source and circuitry comprising a back-up power supply are packaged into a structure having sockets on its top and pins extending from its bottom for use in a vertically-stacked separable relationship with integrated circuit 30. The apparatus of the preferred embodiment of the present invention is constructed to have length and width dimensions substantially the same as those of a conventional integrated circuit connector; thus, the apparatus is space saving inasmuch as a back-up power supply is provided without requiring additional printed circuit board area of the host electronic system.

More specifically, the elements comprising an illustrative embodiment of the present invention are illustrative generally by the reference numeral 34 in exploded, perspective view in FIG. 1. The apparatus 34 includes a controller circuit 36, a double-sided printed circuit board 38, a modified dual-in-line integrated circuit connector 40, a first lead frame 42, a second lead frame 44, a first lithium battery 46, a second lithium battery 48, a metal battery tab 50, and a plastic housing 52.

The controller circuit 36, described in more detail herein below, includes a comparator for comparing the voltage of the primary power supply to the voltage of each battery. It also includes a circuit for automatically directing the source of energy for powering the integrated circuit 30 from whichever power source has the highest voltage. Additional functions of the controller circuit 36 are described below.

In the illustrative embodiment, the controller circuit 36 is a monolithic CMOS integrated circuit chip in a conventional 8-pin dual-in-line integrated circuit package having a lead-shoulder to lead-shoulder width of approximately 0.3 inches and a body length of approximately 0.4 inches. For space-saving reasons that will become more apparent later, five of the pins of the controller circuit 36 are specially bent and trimmed to make electrical contact only to interconnection on the top side of the printed circuit board 38. The remaining three pins of the controller circuit 36 pass through pre-drilled holes in the printed circuit board 38 in the usual manner.

The printed circuit board 38 is a conventional double-sided printed circuit board suitable for solder attachment of electronic components. In the illustrative apparatus 34, the printed circuit board 38 has a width and length of approximately 0.680 inches by 1.380 inches and a thickness of approximately 0.031 inches.

The connector 40 is a conventional 28-pin integrated circuit dual-in-line connector having a plurality of sockets 54 along its top surface in two rows for receiving the pins of the integrated circuit 30. As is conventional, the connector 40 has a plurality of pins extending from its bottom surface in two rows for electrical connection to a printed circuit board. In the present embodiment, the connector 40 is Burndy standard part no. DILB28P11T modified to have three of its 28 pins shorter than its others. The shorter pins of connector 40 are herein designated as connector pin 58, connector pin 60, and connector pin 62. The other pins of the connector 40 are each herein given the reference numeral 56. The connector 40 includes an opening 64, referred to by the manufacturer of the connector as a cooling slot, which is larger than the previously mentioned width and length dimensions of the controller circuit 36. Consequently, the controller circuit 36 may be located within the opening 64. Additionally the plastic body portion of the connector 40 is provided with four short standoffs 66 (only two of which are visible in the perspective view of FIG. 1), the inner portions of which rest against the top of the printed circuit board 38.

The first lead frame 42 and the second lead frame 44 are preferably fabricated from conventional lead material such as a tin-plated nickel and iron alloy or, alternatively, a tin-plated cooper alloy such as CDA194. The second lead frame 44 includes portions designated herein as lead frame pins 68 and a portion designated as rail 70 which ultimately is trimmed off and discarded. Similarly, the first lead frame 42 includes a plurality of lead frame pins 72 and a rail 74. Three of the pins of the first lead frame 42, however, are formed into a particular shape for a purpose that shall be clarified hereinbelow. These three specially-formed pins are designated as pin 76, pin 78, and pin 80. As with the rail 70, it will be seen that the rail 74 is ultimately trimmed off and discarded.

The controller circuit 36, connector 40, first lead frame 42, and second lead frame 44 are assembled onto the printed circuit board 38 by conventional vapor-phase reflow soldering at a temperature of approximately 219° C.

In the preferred embodiment, the first lithium battery 46 and the second lithium battery 48 are each comprised of a standard 3-volt battery manufactured by Ray-O-Vac as Model BR1225. Each of these batteries has a maximum height of approximately 0.098 inches, a maximum diameter of approximately 0.492 inches, and a capacity of approximately 35 mAh. The first lithium battery 46 has a positive terminal 47 which has a spike-like metal tab 51 spot-welded to it. The second lithium battery 48 has a positive terminal 49 which has a metal tab 53 similar to metal tab 51 spot-welded to it. The metal tabs 51, 53 are inserted through pre-drilled holes in the printed circuit board 38. Then the first lithium battery 46 and the second lithium battery 48 are physically attached and electrically connected to the bottom side of the printed circuit board 38 with a conductive adhesive such as Amicon CT-5047-2 two-component silver-filled conductive epoxy adhesive.

The metal battery tab 50 may be fabricated of 0.006 inch thick pre-tinned nickel. It is positioned and then spot-welded at a flat portion 82 to the negative terminal 83 of the lithium battery 46. The metal battery tab 50 is also spot welded at a flat portion 84 to the negative terminal 85 of lithium battery 48. A spike-like up-turned end portion 86 of the metal battery tab 50 is inserted into a pre-drilled hole in the printed circuit board 38 at the same time that the metal battery tab 50 is positioned for the aforesaid spot-welding. After the spot-welding of the flat portion 82 and flat portion 84, the end portion 86 is electrically connected to the printed circuit board 38 by conventional lead/tin soldering.

For manufacturing convenience, each of the foregoing assembly steps may be performed in a batch manner. For example, the printed circuit board 38 may initially be included in a 7×9 array of identical elements on a large printed circuit board (not shown). In accordance with batch processing, it is convenient to assemble all elements of one type on the large printed circuit board before proceeding to assemble the next type of element. After the metal battery tabs 50 have been soldered to the array of printed circuit boards 38, the large printed circuit board is separated into individual partially-assembled units.

Next, the plastic housing 52 is positioned to provide a skirt at the bottom of the connector 40. The plastic housing 52 includes four recesses 88 which accept the outer portions of the standoffs 66 of the connector 40. The opening at the top of the plastic housing 52 is sufficiently large to admit the printed circuit board 38. The lower portions of the walls of the plastic housing 52, however, are thickened toward the inside to provide additional stability and strength. In the preferred embodiment, the plastic housing 52 surrounds and encloses the printed circuit board 38, the first lithium battery 46, the second lithium battery 48, and the metal battery tab 50. The first lead frame 42 and the second lead frame 44 are surrounded but not completely enclosed by the plastic housing 52; that is, the lower portions of the lead frame pins 72, pin 76, pin 78, and pin 80 of the first lead frame 42 and the lower portions of the lead frame pins 68 of the second lead frame 44 extend below the bottom of the plastic housing 52.

Designating the upper surface of the connector 40 as top 92 of the apparatus 34 and designating the lower surface of plastic housing 52 as bottom 94 of the apparatus 34, the apparatus 34 is temporarily placed upside down on its top 92, and an encapsulating material such as Amicon XT-5038-9 insulation compound (not shown) is dispensed into and fills the space surrounded by the plastic housing 52. The encapsulating material then solidifies upon curing. The solidified encapsulating material provides lateral support for the pins of the lead frames 42, 44 and causes the plastic housing 52 to be adhered to the other elements of the apparatus 34.

The rail 70 of the lead frame 44 subsequently is trimmed to separate the pins 68 of the second lead frame 44. Similarly, the rail 74 of the first lead frame 42 is trimmed to separate the lead frame pins 72 and the pins 76, 78, 80 of the first lead frame 42.

For use, the apparatus 34 may be connected to the printed circuit board 32 by conventional soldering methods, or alternatively, may be plugged into a printed circuit board connector which is first soldered onto the printed circuit board 32.

Figure 2:
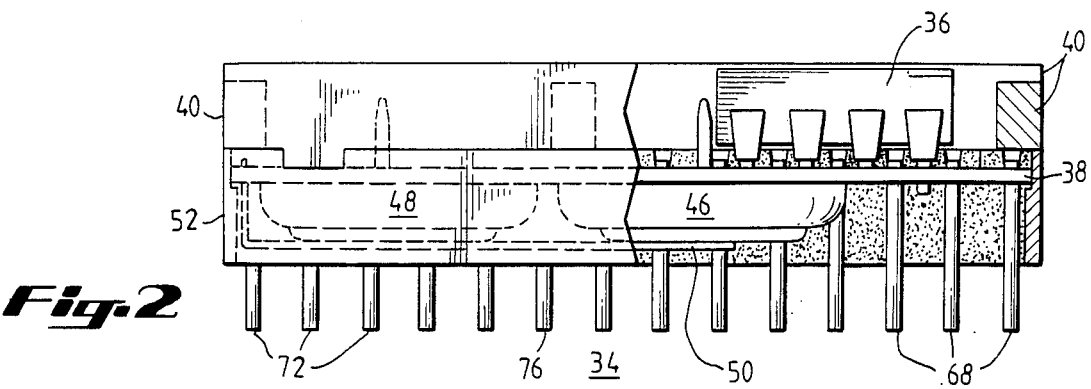
FIG. 2 is a partial cross-section side view assembly drawing of the apparatus of FIG. 1, but with lead frames on the bottom of the apparatus having been trimmed off so as to separate the pins at the bottom of the apparatus.

Referring to FIG. 2, the relationship of the assembled elements of the apparatus 34 may be more clearly understood. In order to avoid inadvertent contact to the positive terminal 47 of the lithium battery 46, in the region where the lithium battery 46 is directly beneath the controller circuit 36, the pins of the controller circuit 36 are not permitted to pass through holes in the printed circuit board 38. Instead, as previously mentioned, certain of the pins of the controller circuit 36 are specially formed so that those pins contact only the top side of the printed circuit board 38.

Figure 3:
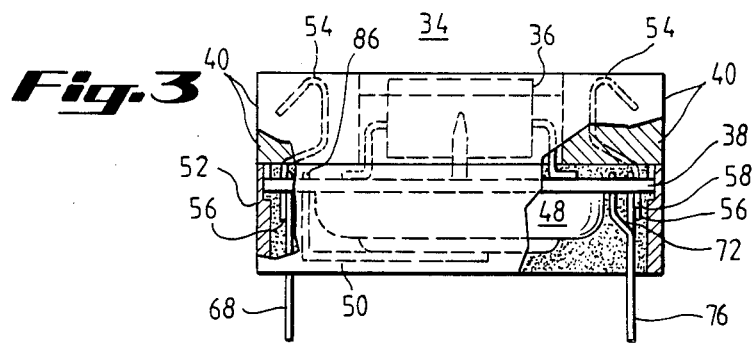
FIG. 3 is a partial cross-section end view assembly drawing of the apparatus of FIGS. 1 and 2.

Referring to FIG. 3, there is illustrated an end view assembly drawing of the apparatus 34. Partial cross-sections in FIG. 3 show the relationship of the elements of the apparatus 34. The end portions of a connector pin 56 and a lead frame pin 68 are passed through a common pre-drilled hole in printed circuit board 38 and consequently are in contact or close proximity to each other. After the reflow soldering step previously described, each lead frame pin 68 functions as an extension of its corresponding connector pin 56. Likewise, each straight lead frame pin 72 of the first lead frame 42 functions as an extension of its corresponding connector pin 56. By comparison, however, the formed lead frame pins 76, 78, 80 do not function as extensions of corresponding connector pins 58, 60, 62. The pin 76 is formed in a shape that allows electrical connection to the printed circuit board 38 while avoiding connection with its corresponding connector pin 58. In the illustrative example, the lead frame pin 76 is interconnected via the printed circuit board 38 to a pin of the controller circuit 36; the connector pin 58 is connected via the printed circuit board 38 to a different pin of the controller circuit 36. By this arrangement, the controller circuit 36 intercepts a chip enable signal (see FIG. 4) from the host electronic system applied to the lead frame pin 76 and provides a controlled chip enable signal via the printed circuit board 38 to the connector pin 58. Because the connector pin 58 is electrically connected to a corresponding socket 54 (as illustrated in FIG. 3), the controlled chip enable signal from the controller circuit 36 is provided to an appropriate socket of the apparatus 34. In a similar manner, in applications where the integrated circuit 30 is a 24-pin 2K×8 standard CMOS integrated circuit memory, a 5-volt normal power supply from the host electronic system is connected to the formed pin 78 which, in turn, is connected to a power input terminal of the controller circuit 36. (When a 24-pin integrated circuit 30 is to be used, it is inserted into the sockets of connector 40 in a manner which leaves two end sockets in each row unused. The four unused sockets include the socket which is connected to the pin 62.) The first lithium battery 46 and the second lithium battery 48 are also connected to input pins of the controller circuit 36 via printed circuit board 38. A comparator and switching circuit included in the controller circuit 36 compares the voltage from the normal or primary power supply with those from the batteries 46, 48 and automatically connects the source of energy having the highest voltage to power the integrated circuit 30. The selected source of energy is directed through the controller circuit 36 and is provided at an output power terminal of the controller circuit 36. This output power terminal is connected to the connector pin 60 via the printed circuit board 38 in the same fashion as the controlled chip enable signal is connected to the connector pin 58. And, likewise, the selected energy source for the integrated circuit 30 is provided to the appropriate corresponding socket 54.

When the apparatus 34 is to be used in applications where the integrated circuit 30 is a 28-pin 8K×8 standard CMOS integrated circuit memory, the selected source of energy is directed to the connector pin 62 and the corresponding socket 54 associated therewith. Accordingly, the formed lead frame pin 80 and the connector pin 62 are arranged in the same manner as the formed lead frame pin 78 and the connector pin 60.

Figure 4:
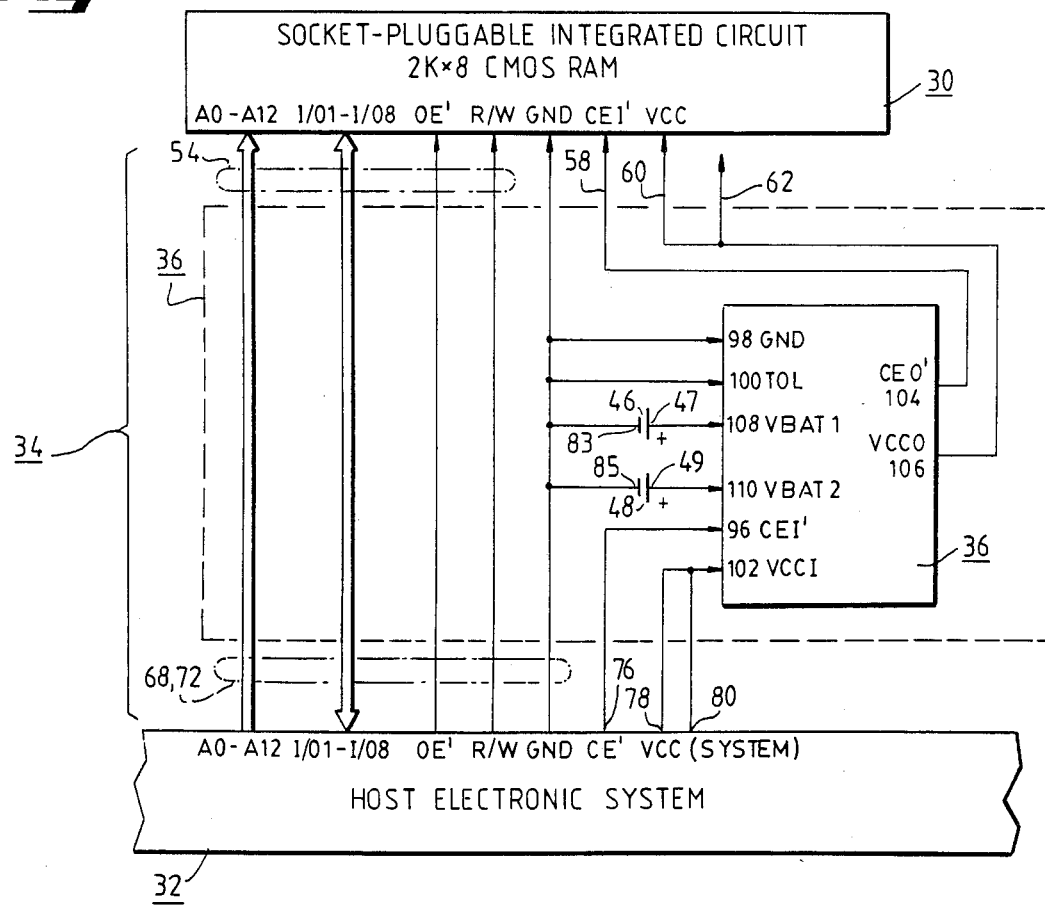
FIG. 4 is a circuit schematic illustrating electrical interconnection of the apparatus of FIGS. 2 and 3 with a host electronic system and an integrated circuit.

Referring to FIG. 4, the electrical connection of the illustrative embodiment with a host electronic system and a 2K×8 CMOS RAM is shown. It can be seen that the chip enable signal applied by the host electronic system via the printed circuit board 32 to the lead frame pin 76 (CE') is intercepted by the controller circuit 36 at a chip enable input 96 (designated herein by the mnemonic CEI'). The ground, GND, of the host electronic system is connected via the straight lead frame pin 54 to the printed circuit board 38, and via the printed circuit board 38 to a GND terminal 98 of the controller circuit 36 as well as to a negative terminal 83 of the first lithium battery 46 and to a negative terminal 85 of the second lithium battery 48. In the illustrative example, an option-select input 100 (designated as TOL) of the controller circuit 36 is similarly connected via the printed circuit board 38 to the GND terminal 98. The positive terminals 47, 49 of the batteries 46, 48 are connected via the printed circuit board 38 respectively to a first battery input 108 (designated as VBAT1) and to a second battery input 110 (designated at VBAT2). The lead frame pins 78, 80 provide connection from the normal or primary power supply of the host electronic system to power an input terminal 102 (designated as VCCI) of the controller circuit 36. A chip enable output 104 (designated as CEO') from the controller circuit 36 is connected to the connector pin 58. The output power terminal 106 (designated as VCCO) from the controller circuit 36 is connected to the connector pin 60 and to the connector pin 62. Selected other nodes of the host electronic system, including address signals A0-A12, I/O signals I/01-I/08, an output enable signal OE', and a read/write signal R/W, are electrically connected via the lead frame pins 68, 72 and the corresponding connector pins 56 to the appropriate corresponding sockets 54 of the apparatus 34 to establish a separable relationship with the socket-pluggable integrated circuit 30.

Figure 5:
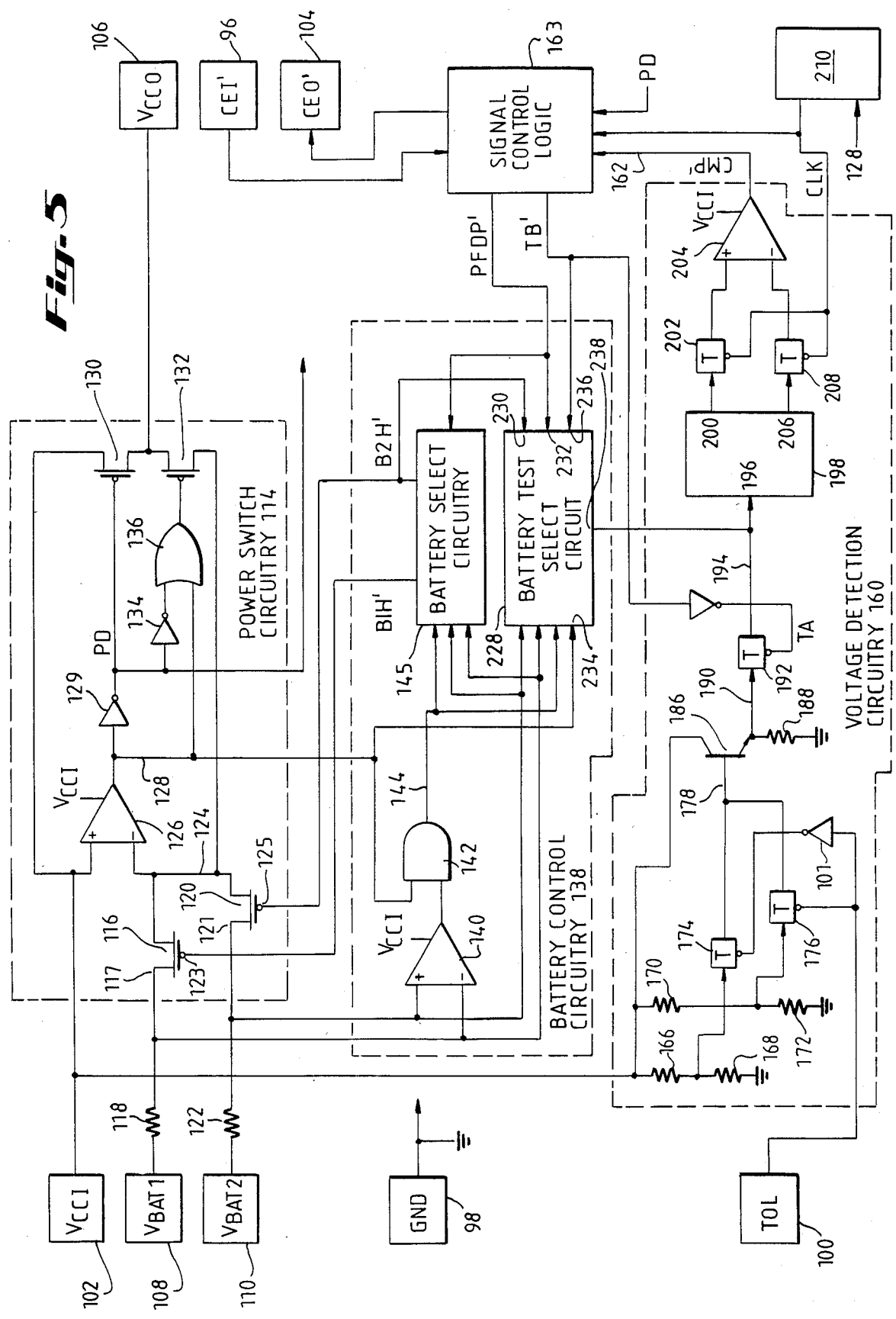
FIG. 5 is a block, logic, and circuit diagram of the controller circuit.

Referring to FIG. 5, there is illustrated a circuit and block diagram of the controller circuit 36 as used in the present illustrative and preferred embodiment. The circuitry of the illustrated controller circuit 36 is designed to be compatible with monolithic N-type substrate/P-well CMOS integrated circuit fabrication. Conventional electrostatic protection on input pins is not illustrated. Also, except where indicated, all circuitry is powered from a voltage designated herein as VCCS, the provision of which is described hereinbelow. It should be further understood that a GND connection is provided to each logic block.

Power-switch circuitry 114 is provided. It includes a P-channel transmission transistor 116 which has its source 117 connected through a resistor 118 to a first battery input 108. Similarly included is a P-channel transmission transistor 120 which has its source 121 connected through a resistor 122 to a second battery input 110. A gate input 123 of the transistor 116 is driven by a signal B1H' and a gate input 125 of the transistor 120 is driven by a signal B2H' Whichever of these signals is at a low voltage (a logic 0) causes its corresponding transmission transistor to become conductive, thereby causing the voltage of the first lithium battery 46 or the voltage of the second lithium battery 48 to be applied to a line 124 which is connected to the drains of the transmission transistors 116, 120. The battery voltage on the line 124 is applied to the negative input of a power-switch comparator 126. VCCI, which is the normal or primary power supply input from the host electronic system 32, is applied to the positive input of the power-switch comparator 126. A line 128 is connected to the output of the power-switch comparator 126. Its signal state is high (logic 1) whenever the voltage applied to the power input terminal 102 (VCCI) is greater than the selected battery voltage on line 124; but the state on the line 128 is a logic 0 whenever the selected battery voltage is greater than VCCI.

The input of an inverter 129 is connected to line 128. The output of the inverter 129 (the signal of which is herein designated as signal PD) is connected to the gate of a P-channel transmission transistor 130 and to the gate of a P-channel transistor 131. When the state of the line 128 is a logic 1, the signal PD is a logic 0, causing the transistors 130, 131 to turn on and thereby connecting VCCI to VCCO and to VCCS. These conditions are herein referred to as the power-up mode. In order to minimize the voltage drop from VCCI to VCCO, the transistor 130 is designed to have a large W/L ratio. Even with a relatively large current through the transistor 130, the voltage drop from source to drain across the transistor 130 is usually less than 0.2 volts. If, however, the state of the line 128 is a logic 0, the signal PD will be a logic 1, and the transistors 130, 131 are turned off. Instead, an inverter 134 and an OR gate 136 will function to render a transistor 132 conductive, thereby connecting either: (1) the first lithium battery 46 to VCCS through transistors 116 and 132 (and resistor 118), or (2) the second lithium battery 48 to VCCS through transistors 120 and 132 (and resistor 122). The voltage VCCO is provided from VCCS through a resistor 135. These conditions are referred to herein as the power-down mode. Because less current typically is required by the integrated circuit 30 in the power-down (battery standby) mode by comparison to that required during the power-up (operating) mode, a W/L ratio of approximately 1,200/3 is adequate for transistors 116, 120, and 132. Each of the resistors 118, 122, and 135 is designed to have a small voltage drop during the power-down mode. The inverter 134 and the OR gate 136 provide a break-before-make switching function in order that the transistor 130 and the transistor 132 are not simultaneously turned on. It will be appreciated that the OR gate 136, as with other logic discussed herein, may be constructed by one of various suitable alternatives; for example, the OR gate 136 may be constructed of a conventional NOR gate having its output in series with a conventional inverter.

Thus, in accordance with the foregoing, the power-switch circuitry 114 directs the source of energy for powering the integrated circuit 30 from the normal power supply of the host electronic system or from one of the batteries included in the apparatus 34. It will be appreciated that whenever the power input terminal 102 (VCCI) is at a lower voltage than that of the selected battery, VCCO is isolated from VCCI because the transmission transistor 130 is rendered non-conductive. Consequently, battery power is provided to the appropriate socket 54 for powering the integrated circuit 30 even if the normal or primary power supply of the host electronic system is short-circuited.

The determination of which battery voltage to select for comparison to VCCI is made by a battery control circuitry 138. The battery control circuitry 138 includes a power-up battery comparator 140 having its positive input connected through the resistor 122 to the second battery input 110 (VBAT2) and its negative input connected through the resistor 118 to the first battery input 108 (VBAT1). The output of the power-up battery comparator 140 is enabled during the power-up mode through an AND gate 142 to provide a logic 1 on a line 144 when the voltage of VBAT2 is greater than that of VBAT1. Accordingly, and as explained in further detail later, the function of the power-up battery comparator 140 is to determine which battery voltage is the greater during the time that the normal power supply of the host electronic system is providing normal power to the system. The line 144 provides an input to a Battery Select Circuitry 145.

Figure 6:
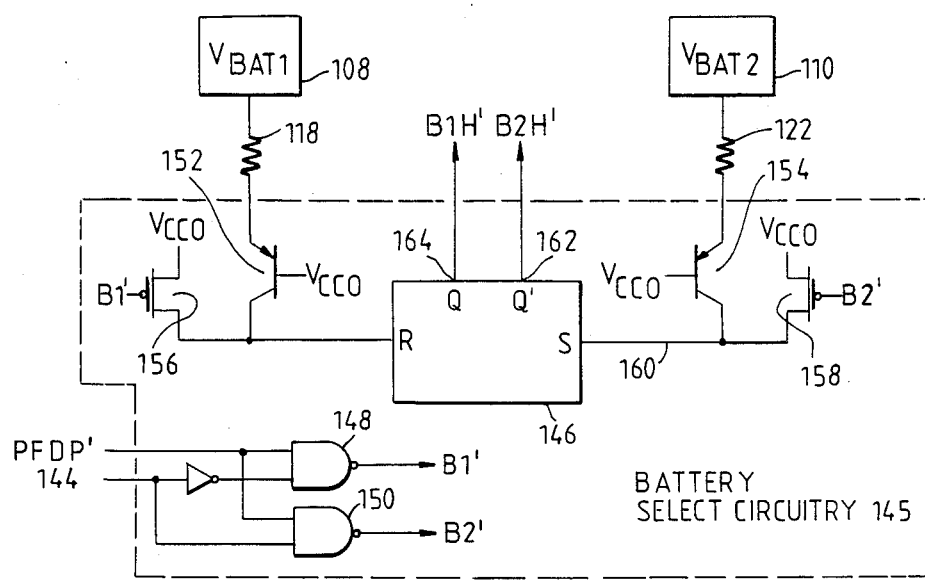
FIG. 6 is a logic and circuit diagram of a functional block of FIG. 5.

Referring to FIG. 6, which illustrates the Battery Select Circuitry 145, it may be seen that a signal B1' from the output of a NAND gate 148 and a signal B2' from the output of a NAND gate 150 are responsive to the logic state on the line 144. The signal PFDP' acts as an enable to the NAND gate 148 and to the NAND gate 150. Although the generation and timing of signal PFDP' is described in more detail below, at this point it should suffice to understand that signal PFDP' becomes a logic 1 a few milliseconds after a normal operating voltage is applied to VCCI; signal PFDP' then remains a logic 1 until such time as VCCI drops to a value below normal operating voltage. The Set and Reset inputs of a non-clocked latch 146 are, through the action of a pair of P-channel transistors 156 and 158, responsive to signal B1' and signal B2'. The Q output 164 of the non-clocked latch 146 provides a signal B1H' and the Q' output 162 provides a signal B2H'. Therefore, during the power-up mode, the power-up battery comparator 140 cooperates with the Battery Select Circuitry 145 to render conductive either the transistor 116 or the transistor 120 according to whichever of the two batteries has the higher voltage. It will be further appreciated that upon power-down of the power input terminal 102, the higher voltage battery will then be automatically directed to the output power terminal 106 through the transmission transistor 132.

During power-down, the conventional design of the power-up battery comparator 140 might not be adequate for proper functioning at the typical battery voltage of 3 volts or less. Thus, in the power-down mode, other circuitry is utilized to monitor the voltage of the two batteries. The mechanism by which the batteries are monitored during power-down and a possible switch of batteries performed, may be understood by further reference to FIG. 6.

The Battery Select Circuitry 145 includes a PNP transistor 152 and a PNP transistor 154. In the described embodiment, the base of each of these transistors is comprised of N-type semiconductor substrate material which is connected to VCCS. As previously noted, in the power-down mode, VCCS is connected through the transistor 132 in series with either the transistor 116 (and the resistor 118) or the transistor 120 (and the resistor 122) to the battery selected for supplying backup power. Also, as previously noted, the initially selected battery is the one having the highest voltage as determined by the power-up battery comparator 140 immediately prior to power-down. Consequently, neither the emitter-base junction of the transistor 152 nor that of the transistor 154 can initially be forward-biased. Thus, the transistor 152 and the transistor 154 both are initially off at the time of power-down and immediately thereafter. Subsequently, however, the voltage of the selected battery may begin to fall. If the voltage of the selected battery (and, hence, VCCS) should fall to a value that is approximately 0.7 volts less than that of the unselected battery, the emitter-base junction of either the transistor 152 or the transistor 154 will become forward-biased, thereby causing either the transistor 152 or the transistor 154 to turn on. Consider, for example, a circumstance in which the voltage of the second lithium battery was higher than that of the first lithium battery immediately prior to power-down, but later the voltage of the second lithium battery decreases to a value less than that of the first battery. In accordance with previously described operation, during the power-up mode, the signal B2H' will be a logic 0 whereas the signal B1H' will be a logic 1. Now during power-down, when the voltage of the second lithium battery drops to approximately 0.7 volts less than that of the first lithium battery, the transistor 152 will turn on causing the non-clocked latch 146 to be reset. Thus, the signal B1H' becomes a logic 0 and the signal B2H' becomes a logic 1, causing the first lithium battery 46 to be selected for supplying power to the output power terminal 106.

In addition to the above-described function of automatically selecting as the source of energy whichever source has the highest voltage, it is often a desirable function to control the chip enable signal applied to the integrated circuit 30 during the power-down mode. Referring again to FIG. 5, a voltage detection circuitry 160 and a Signal Control Logic 163 cooperate in (1) intercepting the chip enable signal applied to the chip enable input 96 and (2) providing the controlled chip enable output 104 which, as previously discussed, is connected to an appropriate socket for the chip enable input of the integrated circuit 30. A standard CMOS RAM, such as comprises the integrated circuit 30, usually requires its chip enable input to be a logic 0 whenever a read or write operation is to be performed.

When the option-select input 100, named TOL, is connected to GND, the voltage detection circuitry 160 operates to produce a logic 1 at its output 162 when the voltage VCCI is greater than a predetermined level of approximately 4.6 volts. Alternatively, if the option-select input 100 is connected instead to VCCO, the predetermined level for VCCI to cause output 162 to become a logic 1 is approximately 4.4 volts. The signal provided by the output 162 is designated herein as signal CMP'. The option-select input 100 in conjunction with an inverter 101 determines whether the output of a resistor divider comprised of a resistor 166 and a resistor 168 or whether a resistor divider comprised of a resistor 170 and a resistor 172 will be connected through a transmission gate 174 or a transmission gate 176, respectively, to a line 178.

The transmission gate 174 is comprised of a P-channel transmission transistor 180 connected in parallel with an N-channel transmission transistor 182, the gate of which is driven by an inverter 184. When the control input is at a logic 0, the transistor 180 and the transistor 182 are both turned on in the manner of a switch, thereby connecting the output of the transmission gate to its input.

Referring now again to FIG. 5, the voltage on the line 178 is applied to the base of an NPN transistor 186. The transistor 186 is in an emitter-follower configuration with a resistor 188; therefore, the voltage on a line 190 will be approximately 0.7 volts less than that on the line 178. If the circuitry is not performing a battery test, an operation which is described later, a transmission gate 192 is turned on, allowing the voltage on the line 190 to be applied to a line 194. The line 194 is connected to an input 196 of a bandgap reference circuit 198 which is of conventional design. The bandgap reference circuit 198 has a first output 200 which may be connected through a transmission gate 202 to the positive input of a comparator 204. The bandgap reference circuit 198 has a second output 206 which is connected through a transmission gate 208 to the negative input of the comparator 204. The bandgap reference circuit 198 is arranged so that its first output 200 and its second output 206 are equal when its input 196 is at 2.0 volts. When input 196 is greater than 2.0 volts, the voltage of the first output 200 is greater than that of the second output 206; conversely, when the input 196 is less than 2.0 volts, the voltage of the first output 200 is less than that of the second output 206. A clock generator 210 generates a signal CLK which, by turning on the transmission gates 202 and 208, causes the first output 200 and the second output 206 to be sampled by the comparator 204 when the signal CLK goes low. The clock generator 210 includes a five-stage ring oscillator which generates an approximately 40 kHz rate for the signal CLK. The line 128 (the output of the power-switch comparator 126) carries an input signal to the clock generator 210. The input signal on the line 128 allows the clock generator 210 to run when the voltage VCCI is greater than that of the selected battery, but causes the clock generator to stop running during the power-down mode.

In accordance with the foregoing description, the voltage detection circuitry 160 detects whether the voltage of the normal or primary power supply is lower or higher than a predetermined level, the predetermined level for the illustrative embodiment being either approximately 4.6 volts or approximately 4.4 volts depending upon whether the option-select input 100 is connected to VCCO or to GND. The output 162 of the voltage detection circuitry 160 is connected to the Signal Control Logic 163. As previously noted, the Signal Control Logic 163 intercepts the chip enable input 96 and provides the controlled chip enable output 104 for the integrated circuit 30.

Figure 7:
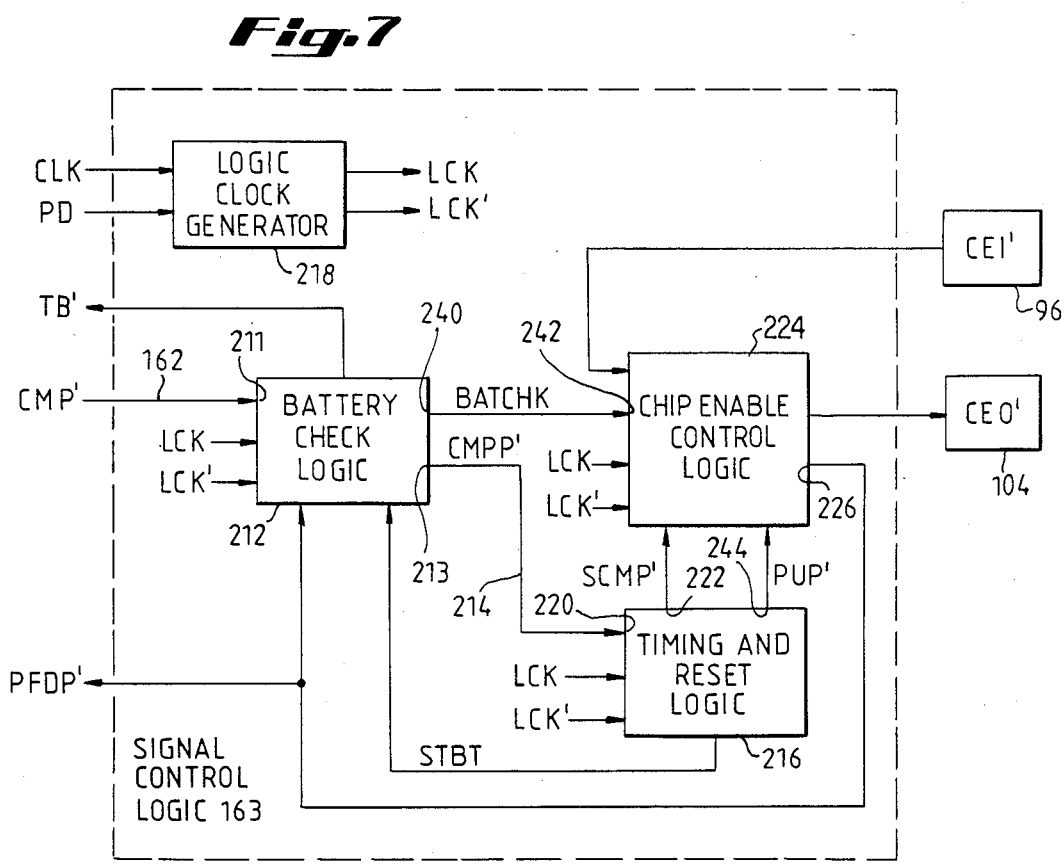
FIG. 7 is a more detailed block diagram of the Signal Control Logic Block of FIG. 5.

Referring to FIG. 7, a block diagram of the Signal Control Logic 163 is illustrated. The signal CMP' is directed to an input 211 of Battery Check Logic 212. Except during the period when a battery test is performed, the input 211 is connected through a transmission gate included in the Battery Check Logic 212 to an output 213 of the Battery Check Logic 212. The output 213 provides a signal CMPP' and is connected via a line 214 to an input 220 of Timing and Reset Logic 216. A Logic Clock Generator 218 is responsive to the signal CLK and to a signal PD to generate a logic clock signal LCK and a logic clock signal LCK'. When the signal PD is at a logic 0, the logic clock signal LCK is logically the same as the signal CLK and the signal LCK' is the complement of the signal CLK. When, however, the signal PD is a logic 1, the logic clock signals LCK and LCK' are inhibited; that is, the logic clock signal LCK is forced to be a logic 1, and the signal LCK' is forced to be a logic 0. The logic clock signals LCK and LCK' operate to clock D-type latches included in each of the logic blocks within the Signal Control Logic 163. It may be recalled that the signal PD is a logic 0 when power input terminal 102 is connected through the transistor 130 to the output power terminal 106. Consequently, all clocking of the Signal Control Logic 163 occurs during the power-up mode.

As previously described, during the power-up mode, if VCCI is higher than a predetermined level (for example, 4.6 volts) the signal CMP' will be a logic 1. The signal CMPP' is likewise a logic 1. Under these conditions, the chip enable output 104 is directly responsive to the chip enable input 96.

Upon a failure of the normal power supply of the electronic system, voltage VCCI will begin to decrease. Presently available CMOS RAMS which may comprise the integrated circuit 30 are typically specified to operate at a voltage of 5 volts, plus or minus either 5 percent or 10 percent. Thus, such circuits are typically specified to operate properly at a minimum voltage of either 4.75 volts or at 4.5 volts. It is desirable to inhibit the chip enable input to such an integrated circuit memory when the power supply voltage becomes slightly less than the specified minimum operating voltage. By becoming a logic 0, the signal CMP' provides an indication to the Signal Control Logic 163 that such a lowered voltage condition has occurred. The signal CMPP' likewise becomes a logic 0. If the signal CMPP' remains at a logic 0 for three cycles of the signal CLK, an output 222 of the Timing and Reset Logic 216 will transition from a logic 1 to a logic 0, thereby providing to Chip Enable Control Logic 224 an indication that the normal system power supply is beginning to fail. After three more cycles of signal CLK, the signal PFDP' from an output 226 of the Chip Enable Control Logic 224 will transition from a logic 1 to a logic 0. If at that time the integrated circuit 30 is presently being accessed, the chip enable input 96 and the chip enable output 104 will both be at logic 0. When the chip enable input 96 is driven by the host electronic system to a logic 1, indicating that the present access of the memory is complete, the chip enable output 104 will likewise transition to a logic 1 and, until a below-described power-up sequence is completed, the chip enable output 104 will not be responsive to the chip enable input 96. Instead, the chip enable output 104 will be held at a logic 1 by the Chip Enable Control Logic 224, thereby preventing any read or write operations of the integrated circuit 30. If for any reason the chip enable input 96 fails to transition from a 0 to a 1, the logic of Chip Enable Control Logic 224 is designed such that the chip enable output 104 nevertheless transitions from a logic 0 to a logic 1 at the next cycle of the signal CLK.

From the foregoing, because the Signal Control Logic 163 of the illustrative embodiment requires at least six cycles of the signal CLK before inhibiting the chip enable output 104, a fall in VCCI preferably is not at a rate faster than approximately 1 millivolt per microsecond, at least for an initial transition from 4.75 volts to approximately 4.25 volts.

Referring again to FIG. 5, it was previously described that, upon power-down, the highest battery voltage is initially selected to provide energy for powering the integrated circuit 30. It was also previously described that the Battery Select Circuitry 145 monitored the battery voltages during power-down and might cause the initially selected battery to switch out and the other battery to switch in. After the controller circuit 36 has been in the power-down mode and then is powered up, it is desirable to perform a battery voltage test. This test determines whether the voltage of each battery used during the power-down mode might have fallen below a predetermined level which is the specified minimum standby voltage of the integrated circuit 30. If the battery voltage has fallen below the specified minimum standby voltage, data in the integrated circuit 30 may have been lost. This predetermined level for the illustrative embodiment is approximately 2.0 volts. More specifically, if the initially selected battery was utilized for the entire duration of power-down, it is desirable to measure the voltage of that battery at the time of power-up and to provide a warning to the host electronic system if the measured voltage is less than 2.0 volts. If, however, one or more battery switches were performed during the power-down mode, it is desirable to measure the voltage of whichever battery is at the lowest voltage at the time of power-up and to provide a warning to the host electronic system if the measured voltage is less than 2.0 volts.

In order to provide such a warning to the host electronic system, the present illustrative embodiment includes logic (described below) in the controller circuit 36 to cause the second chip enable output signal following power-up to be inhibited if the tested battery voltage is less than 2.0 volts. Inhibiting the second chip enable output after power-up provides an indication to the host electronic system of the result of the battery test without requiring an additional pin or output from the controller circuit 36.

The host electronic system can determine whether the second chip enable to the integrated circuit 30 was disabled in the following-described manner. First, it should be recalled that integrated circuit 30 requires all read and write cycles to be executed using the chip enable signal. After power-up, a read cycle is performed to any specific memory location in the integrated circuit 30. Next, the host electronic system attempts to perform a write cycle of opposite data to the same memory location in integrated circuit 30. Finally, another read cycle is performed at the same memory location. The result of the second read cycle is sufficient to determine whether the write cycle was inhibited.

For recording whether a battery switch occurred during the power-down mode, a Battery Test Select Circuit 228 includes logic responsive to the signals B2H' applied to an input 230, the signal PFDP' applied to an input 232, and the signal from the output of the power-switch comparator 126 applied to an input 234. If no battery switch was performed, then at an appropriate time as indicated by a signal TB' applied to an input 236, the Battery Test Select Circuit 228 connects the appropriate battery input, either the first battery input 108 or the second battery input 110, through a P-channel transmission transistor to an output 238 of the Battery Test Select Circuit 228. The output 238 is connected to the input 196 of the bandgap reference circuit 198. During the time that the appropriate battery voltage is applied to the input 196, the transmission gate 192 is turned off by signal TB (which is the complement of the signal TB') being at a logic 1. In the same manner as previously described for the measurement of VCCI, the bandgap reference circuit 198, the transmission gate 202, the transmission gate 208, the comparator 204, and the clock generator 210 cooperate to provide a logic 1 for the signal CMP' if the input 196 is greater than 2.0 volts and a logic 0 if the input 196 is less than 2.0 volts.

If the Battery Test Select Circuit 228 recorded during the power-down mode that a battery switch had taken place, the power-up battery comparator 140 is utilized to determine which of the two batteries has the lower voltage. This battery information is communicated to the Battery Test Select Circuit 228 by the line 144. At the time designated by the signal TB' for performing the battery test, the Battery Test Select Circuit 228 connects the lower voltage battery through a P-channel transmission transistor to the output 238 for measurement by the bandgap reference circuit 198 in conjunction with the comparator 204 as previously described.

Referring once again to FIG. 7, the battery test function may be better understood. As previously discussed, after VCCI has risen to a sufficient value, the signal CMP' becomes a logic 1. The signal CMP' continues to be directed through a transmission gate within the Battery Check Logic 212 to provide the signal CMPP' to the Timing and Reset Logic 216. A divide-by-64 counter included within the Timing and Reset Logic 216 is permitted to start counting after the detection of the CMPP' signal having transitioned to a logic 1 at the input 220. Approximately 3.2 milliseconds after the detection of a logic 1 at the input 220, an output signal STBT is provided by the Timing and Reset Logic 216. The Battery Check Logic 212 is responsive to the signal STBT for causing the signal TB' to go to a logic 0 for one period of signal CLK, thereby connecting the output 238 of the Battery Test Select Circuit 228 to the input 196 of the bandgap reference circuit 198. During the same cycle of the signal CLK, the Battery Check Logic 212 disconnects its input 211 from its output 213 and, instead, connects its input 211 to its output 240, thereby directing the signal CMP' through a transmission gate to provide an output signal BATCHK. The signal BATCHK is applied to an input 242 of the Chip Enable Control Logic 224. A latch included within the Chip Enable Control Logic 224 records whether the signal BATCHK was a logic 0 or a logic 1 during the cycle of the signal CLK that the appropriate battery voltage was tested.

During the next cycle of the signal CLK, the Battery Check Logic 212 causes the signal TB' to become a logic 1 and causes its input 211 to be reconnected to its output 213. Additional counter stages are utilized within the Timing and Reset Logic 216 to generate an additional delay of approximately 3.2 milliseconds before the Timing and Reset Logic 216 generates a logic 0 for a signal PUP' at its output 244. The Chip Enable Control Logic 224 is responsive to the signal PUP' for re-enabling the chip enable output 104. Therefore, after a total of approximately 6.4 milliseconds following VCCI having powered up to a voltage greater than 4.6 volts (assuming option-select input 100 is at GND), the chip enable output 104 becomes responsive to the chip enable input 96 which is driven by the host electronic system. If the signal BATCHK was a logic 0 during the battery test, the Chip Enable Control Logic 224 monitors the number of transitions of the chip enable input 96 and causes the second logic 1 to logic 0 transition of the chip enable output to be inhibited.

It is thought that the space-saving back-up power supply apparatus and method of the present invention and many of its attendant advantages will be understood from the foregoing description. It will be apparent that various changes may be made in the form, construction, and arrangement of the parts thereof without departing from the spirit and scope of the invention or sacrificing all of its material advantages.

What is claimed is:

1. Socket apparatus for use in an electronic system having a primary power supply node and having electrical nodes other than said power supply node, the apparatus being configured to receive in a vertically-stacked separable relationship a socket pluggable package containing an integrated circuit, the apparatus comprising:
   support structure having first and second sides;
   a plurality of sockets supported from the first side of said support structure for removably making electrical connection to the electrical terminals of said socket-pluggable integrated circuit package;
   a plurality of pins supported from the second side of said support structure, said pins being configured for making electrical connection to said primary power supply node and to selected ones of said other electrical nodes of the electronic system, wherein a first set of said pins is electrically connected directly to certain corresponding ones of said sockets, and wherein a second set of pins is not directly connected to corresponding ones of said sockets, and wherein the pin connected to said primary power supply is in said second set;
   one or more batteries supported from said structure; and
   electronic circuit means supported from said support structure and coupled to said sockets and to said plurality of pins for automatically coupling either the primary power supply or at least one of said batteries to said integrated circuit as the source of energy therefor, said electronic circuit means including comparator and switching means for selecting as the source of energy whichever of the primary power supply or battery has the highest voltage, and for providing power to said integrated circuit even if the said primary power supply becomes short-circuited.

2. The socket apparatus according to claim 1, wherein said integrated circuit is a semiconductor memory having a chip enable signal to enable operation of said memory and wherein said electronic circuit means further includes:
   voltage detection means coupled to said power supply pin and supported from said support structure for detecting the voltage level of said primary power supply with respect to a predetermined level and for generating a detector signal indicative of the value of said voltage level with respect to said predetermined level; and
   signal control means supported from said support structure and responsive to said detector signal for providing a chip enable signal to an appropriate socket of said structure, whereby said chip enable signal is communicated to said integrated circuit memory as its chip enable signal.

3. The socket apparatus according to claim 2, wherein said voltage detection means includes means for detecting a pair of voltages for said predetermined level and means for selecting one of said pair of voltages as said predetermined level.

4. The socket apparatus according to claim 1 or 2, wherein said support structure, said pins, and said sockets are arranged as a dual-in-line connector having at least twenty pins.

5. The socket apparatus according to claim 2 and further including battery test means supported by said support structure for testing the battery voltage level against a second predetermined level.

6. The socket apparatus according to claim 5 and further including means for inhibiting said chip enable signal after the second transition from a logic 1 to a logic 0 of said chip enable signal upon the condition that said battery voltage level is less than said second predetermined level.

7. The socket apparatus according to claim 6, wherein said battery test means includes means for selecting for tests the battery having the lowest voltage level.

8. A method of assembling socket apparatus for providing back-up power supply to a socket-pluggable integrated circuit in an electronic system having a primary power supply, the socket apparatus including a monolithic controller circuit, sockets for receiving the terminals of the socket-pluggable integrated circuit, lead frame pins, and one or more batteries, comprising the steps of:

mounting the controller circuit onto a support structure;

mounting the sockets on one surface of the support structure;

mounting the lead frame pins on the other surface of said support structure;

supporting one or more batteries on said other surface of said support structure;

electrically interconnecting said controller circuit to selected ones of said sockets and selected ones of said pins;

providing one pin for electrical connection to said primary power supply; and said step of electrically interconnecting including the steps of (1) directly connecting corresponding sockets and pins for a first set of less than all of said pins, and (2) electrically interconnecting said controller circuit between the sockets and pins for a second set of the remaining pins, whereby the pin for connecting said primary power supply is selected as one of said remaining pins.

9. The method according to claim 8, wherein said integrated circuit is a semiconductor memory having a chip enable signal for enabling operation thereof, and wherein said electronic system produces a chip enable signal, and further comprising the steps of:

electrically connecting another lead frame pin to receive said chip enable signal;

selecting said another lead frame pin as one pin of said second set;

generating a controlled chip enable signal using said controller circuit and providing said controlled chip enable signal to a socket adapted to provide the chip enable signal to said semiconductor memory.

* * * * *